Inventor
Walter Hage
By Clarence A. O'Brien
Hyman Berman
Attorneys

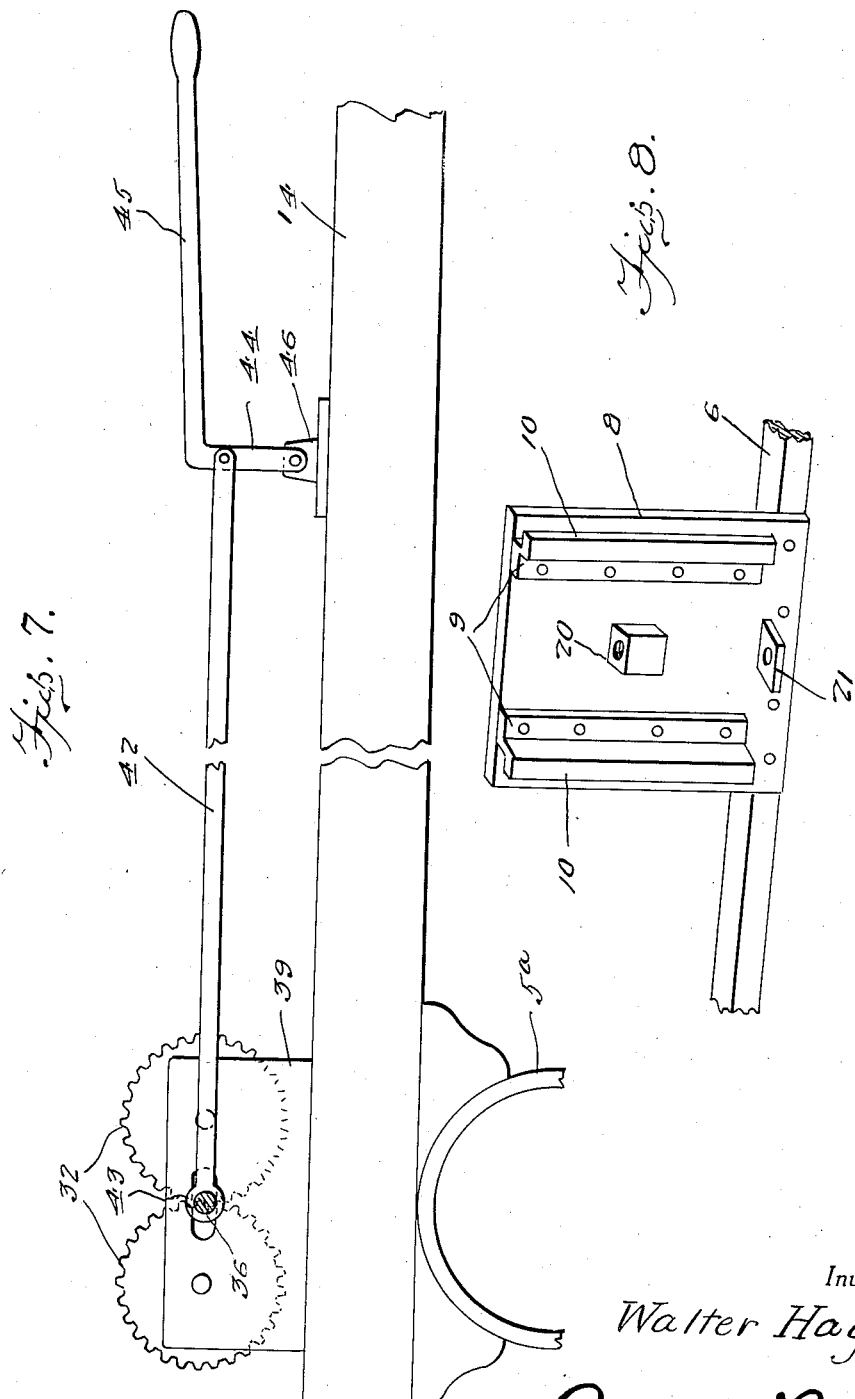

Patented June 13, 1939

2,161,814

UNITED STATES PATENT OFFICE 2,161,814

PLATFORM MOUNT AND LIFT FOR WINDROWERS

Walter Hage, Hillsboro, N. Dak., assignor of one-half to Harry M. Anderson, Hillsboro, N. Dak.

Application January 7, 1937, Serial No. 119,501

2 Claims. (Cl. 56—211)

This invention appertains to new and useful improvements in crop windrowers or swathers and an important object is to provide an adjustable mount for the platform of the machine at a position between the usual drive wheel and grain wheel, instead of in front of the grain wheel, thus eliminating the requirement for counterbalancing at the rear of the machine.

Another important object is to provide a crop windrower having a frame extension permitting the grain wheel to be mounted a sufficient distance from the drive wheel so that the platform can be mounted between the said wheels with its longitudinal center in a vertical plane with the axes of the wheels.

Still another object is to provide a crop windrower having a frame construction on which means is provided permitting vertical adjustment of the platform, with the cutting bar and reel as one assembly, in counterbalanced position between the usual grain and drive wheels of the windrower.

These and various other important objects and advantages of the invention will become apparent to the reader of the following specification.

In the drawings:

Figure 7 is a sectional view taken substantially on the line 7—7 of Figure 1.

Figure 8 is a fragmentary perspective view of the frame and one of the slide plates.

Figure 1:
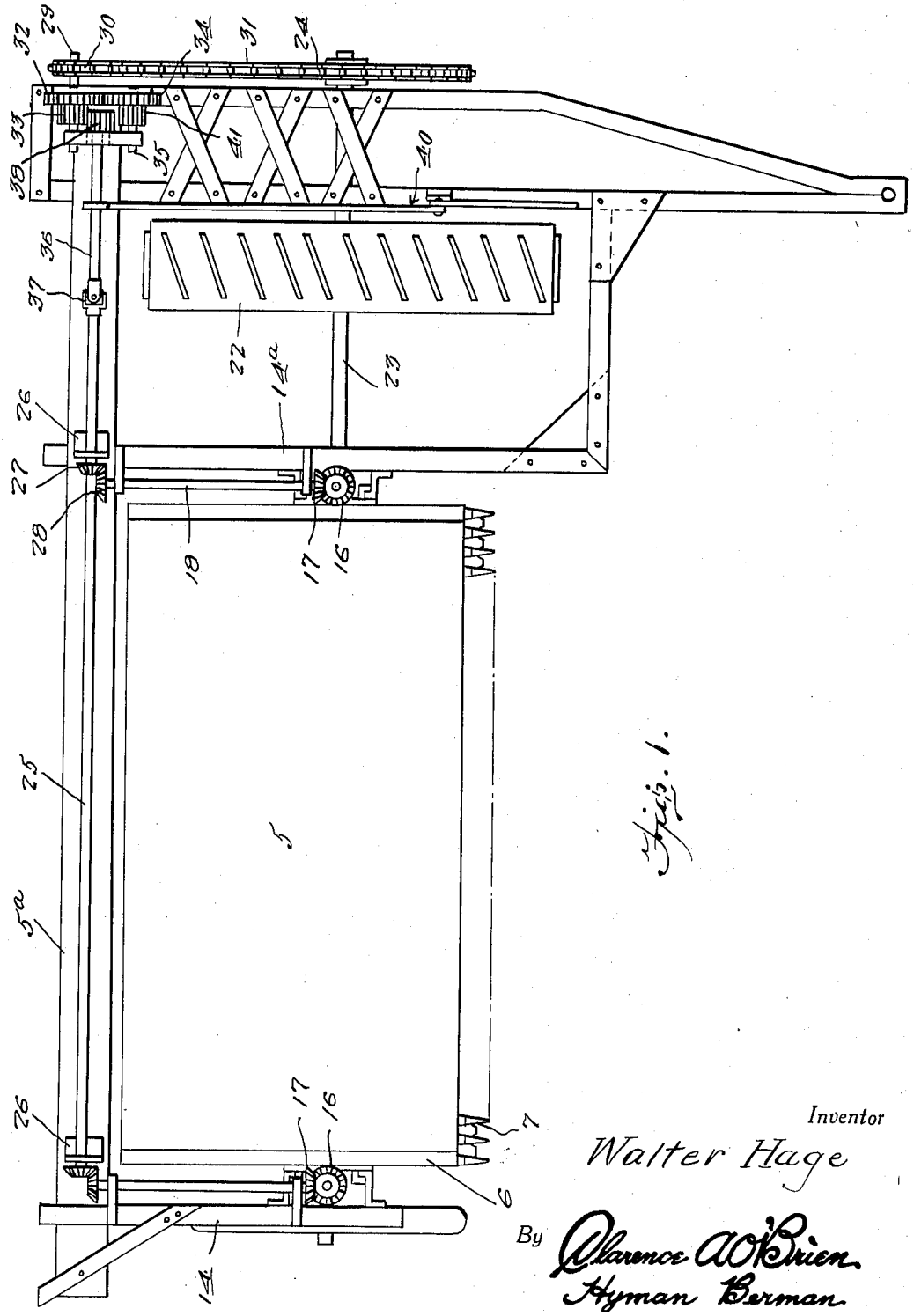
Figure 1 represents a fragmentary top plan view of a windrower showing the platform and lifting mechanism.

Referring to the drawings wherein like numerals designate like parts, it can be seen that numeral 5 represents the platform of the windrower which includes its frame 6, at the forward portion of which is located the cutting bar 17.

Figure 2:
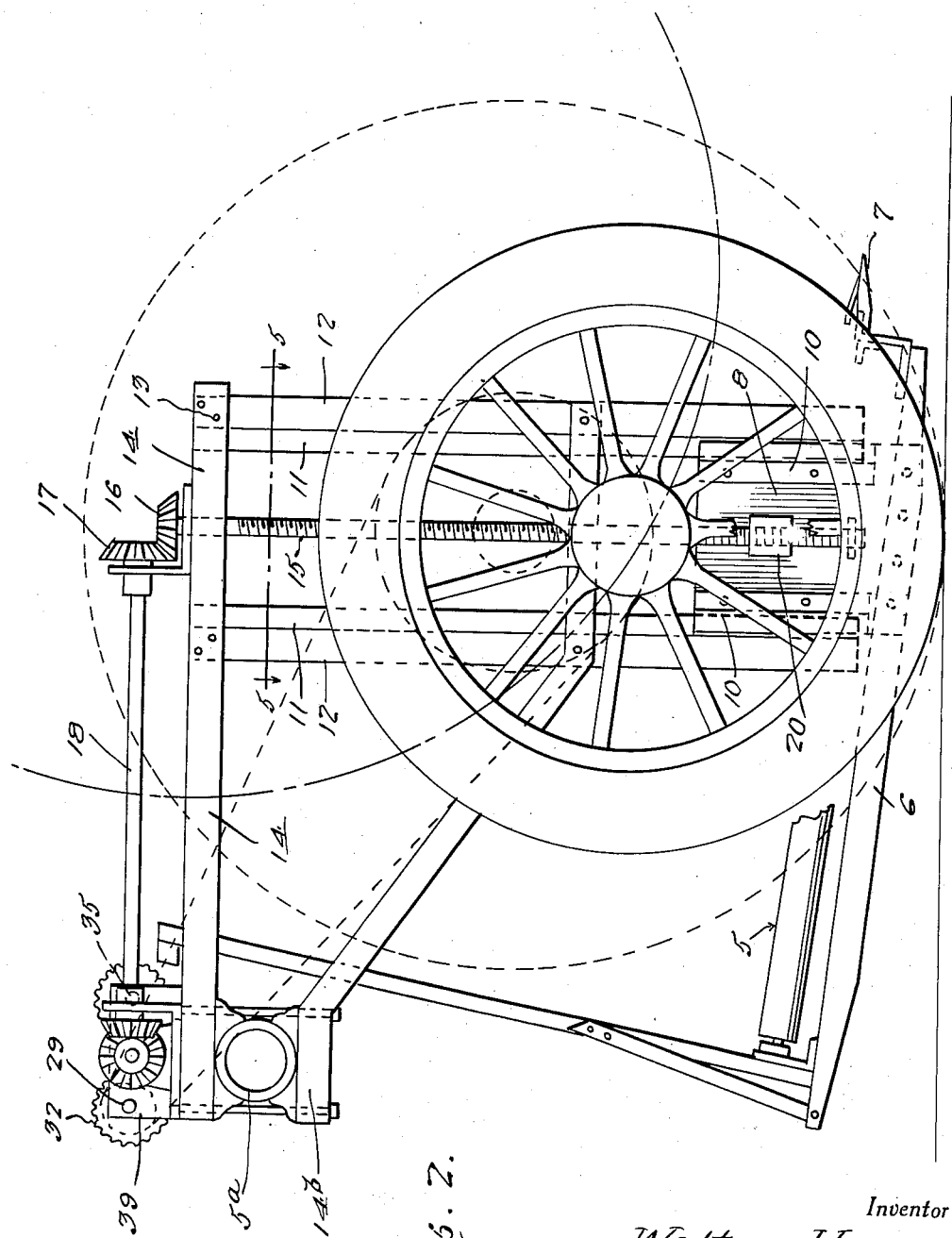
Figure 2 is a side elevational view showing the lifting means.
Figure 3:
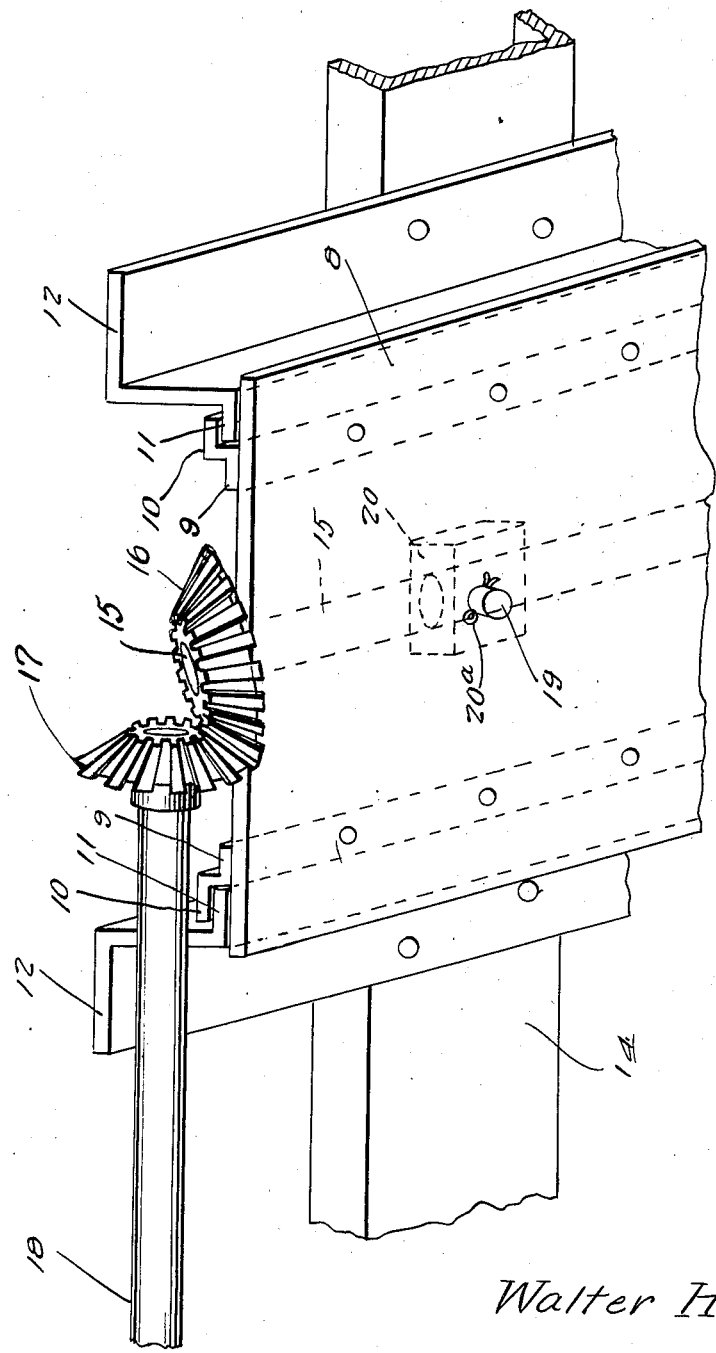
Figure 3 is an enlarged fragmentary perspective view showing the guide at one end of the platform.
Figure 4:
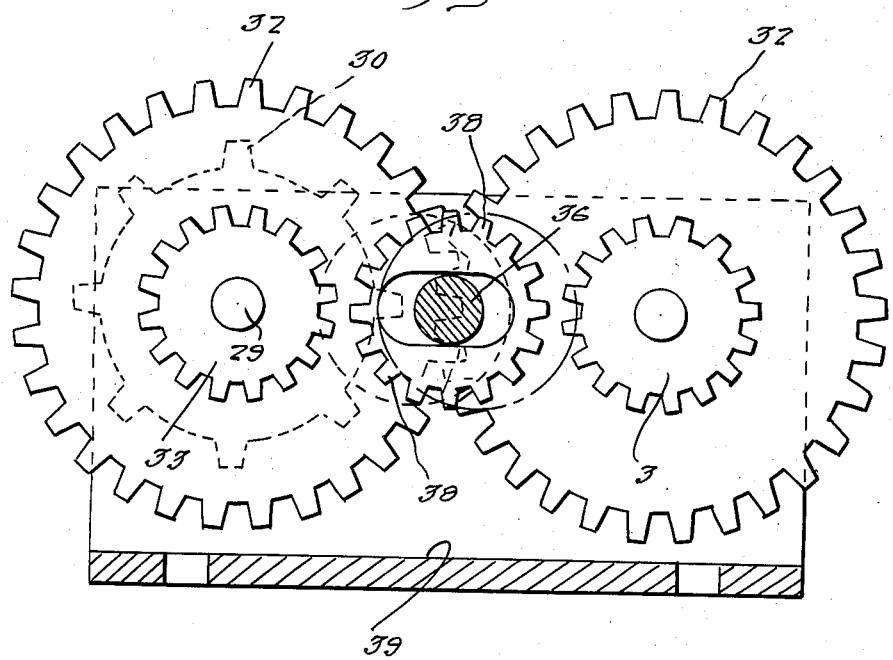
Figure 4 is an enlarged sectional view taken substantially on the line 4—4 of Figure 1.
Figure 5:
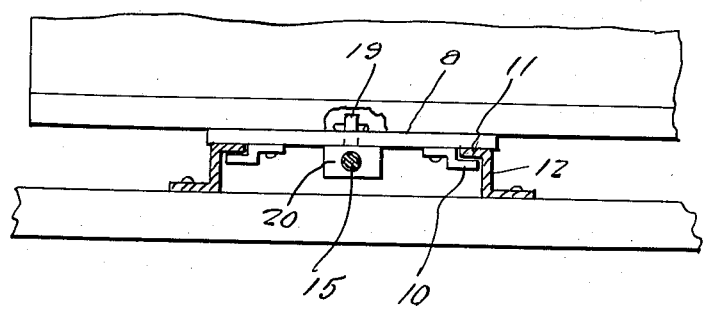
Figure 5 is a horizontal sectional view taken substantially on the line 5—5 of Figure 2.
Figure 6:
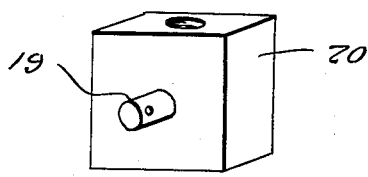
Figure 6 is a perspective view of one of the internally threaded blocks.

Rising from each end of the frame 6 is a slide plate 8 to the outer side of which is secured a pair of vertically disposed cleats 9—9 provided with guide flanges 10, the same engaging behind guide flanges 11 on the vertical angle iron posts 12—12, which are secured at their upper ends as at 13 to the forwardly projecting frame members 14—14a. Through the said frame members 14—14a the upper ends of the screw shafts 15 are journaled and equipped with the bevel gears 16 which mesh with bevel gears 17 on the horizontal shaft 18. It can be seen in Figure 2 that these frame members 14—14a are secured as at 14b to the elongated tubular casing 5a.

Each of the slide plates 8 is provided with an opening therein through which the shank 19 on the corresponding block 20 is disposed and a cotter key or the like 20a is placed through the shank 19 to prevent displacement of the block from the corresponding plate 8.

Each of the blocks 20 is provided with a vertically disposed threaded bore therein for receiving the screw shaft 15 while the lower end of the screw shaft is disposed through an apertured guide plate 21.

Numeral 22 represents the drive wheel on the shaft 23 which at one end is provided with the sprocket wheel 24.

A horizontally disposed shaft 25 is supported on the case 5a by bearings 26 and this shaft 25 is provided with bevel gears 27 meshing with the bevel gears 28 on the adjacent end of the aforementioned shaft 18.

Mounted adjacent the drive wheel 22 is the short shaft 29 having a sprocket 30 thereon and trained over the sprocket 24—30 is the sprocket chain 31. On the shaft 29 is the gear 32 and pinion 33, the gear 32 meshing with the gear 34 on the countershaft 35.

The shaft 25 is provided with a short shaft extension 36 connected thereto by the universal joint 37. This short shaft 36 has the gear 38 carried thereby. The shaft section 36 extends through a horizontal slot in the supporting plate 39.

Numeral 40 represents the operating means for the shaft section 36 whereby the gear 38 thereon can be meshed with either the gear 34 on the shaft 29 or the gear 41 on the shaft 35. This determines whether the screw shafts 15 are to be rotated one way or the other for lifting or lowering the platform, cutting bar and reel assembly.

The means for adjusting the shaft extension 36 consists as shown in Figure 7 of an elongated connecting rod 42 having a collar 43 at one end receiving the shaft section 36 and being pivotally connected at its opposite end to the upstanding portion 44 of the lever 45. The main portion of the lever 45 being bent substantially horizontal as shown in Figure 7, while the lower end of the portion 44 is pivotally connected to the base plate 46.

While the foregoing specification sets forth the invention in specific terms, it is to be understood that numerous changes in the shape, size and materials may be resorted to without departing from the spirit and scope of the invention as claimed hereinafter.

What is claimed is:

1. A platform mount and lift for windrowers comprising a frame structure including a horizontal portion and pairs of vertically arranged posts depending from the horizontal portion to slidably receive therebetween a platform of a windrower having a frame, guide flanges on said posts, an axle journaled on the frame structure with the pairs of posts straddling the axle, a ground power wheel secured on the axle adjacent one end thereof and arranged at one side of the frame of the platform, a ground wheel supporting the axle adjacent its other end and arranged on opposite side of the platform from said power wheel, upstanding plates secured on opposite sides of the platform frame and slidable between the pairs of posts, guide flanges on the plate and slidably engaging the guide flanges of the posts for slidably mounting the platform for adjustment towards and from the ground, vertically arranged screw shafts journaled on the frame structure and arranged between the pairs of posts, screw blocks meshing with the screw shafts and pivotally connected on the upstanding plates, a driven shaft journaled on the horizontal portion of the frame structure, means for connecting said driven shaft to thes crew shafts, and a manually controlled reversible drive means connecting the driven shaft to the axle adjacent the power wheel.

2. A platform mount and lift for windrowers comprising a frame structure including a horizontal portion and pairs of vertically arranged posts depending from the horizontal portion to slidably receive therebetween a platform of a windrower having a frame, guide flanges on said posts, an axle journaled on the frame structure with the pairs of posts straddling the axle, ground wheels supporting said axle and one of said wheels being secured on the axle for rotating the latter by the forward movement of the frame structure, upstanding plates secured on opposite sides of the platform frame and slidable between the pairs of posts, guide flanges on the plates and slidably engaging the guide flanges of the posts for slidably mounting the platform for adjustment towards and from the ground, vertically arranged screw shafts journaled on the frame structure and arranged between the pairs of posts, screw blocks meshing with the screw shafts and pivotally connected on the upstanding plates, a sectional driven shaft having one section thereof journaled on the horizontal portion of the frame structure, means connecting said last-named section of the driven shaft to the screw shafts, a mounting carried by the horizontal portion of the frame structure and supporting the other section of the driven shaft for rotation and a limited swinging movement, a gear secured to the last-named section of the driven shaft, intermeshing reversing gears journaled on the frame structure to have said first gear alternatingly mesh therewith and disconnected from either of the reversing gears by the swinging movement of the last-named section of the driven shaft, an operating means for said latter-named section of the driven shaft and carried by the frame structure, a universal joint connecting the sections of the driven shaft, and a drive means connecting one of the reversing gears to the axle.

WALTER HAGE.